United States Patent
Kim et al.

(10) Patent No.: US 10,268,323 B2
(45) Date of Patent: Apr. 23, 2019

(54) FLEXIBLE DISPLAY DEVICE WITH TOUCH PANEL

(71) Applicant: Samsung Display Co., Ltd., Yongin (KR)

(72) Inventors: Young Sik Kim, Cheonan-si (KR); Jung Mok Park, Hwaseong-si (KR); Chang Bum Kim, Asan-si (KR); Hyung Chul Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 765 days.

(21) Appl. No.: 14/693,496

(22) Filed: Apr. 22, 2015

(65) Prior Publication Data

US 2016/0011689 A1   Jan. 14, 2016

(30) Foreign Application Priority Data

Jul. 14, 2014   (KR) .......................... 10-2014-0088639

(51) Int. Cl.
*G06F 1/16* (2006.01)
*G06F 3/041* (2006.01)
*G06F 3/044* (2006.01)
*G06F 3/045* (2006.01)

(52) U.S. Cl.
CPC .............. *G06F 3/044* (2013.01); *G06F 3/041* (2013.01); *G06F 3/045* (2013.01); *G06F 1/1652* (2013.01); *G06F 2203/04102* (2013.01); *G06F 2203/04103* (2013.01); *G06F 2203/04111* (2013.01)

(58) Field of Classification Search
CPC .......... G06F 3/044; G06F 3/041; G06F 3/045; G06F 1/1652; G06F 2203/04102; G06F 2203/04103; G06F 2203/04111
See application file for complete search history.

(56) References Cited

U.S. PATENT DOCUMENTS

| 8,603,574 B2 | 12/2013 | Huang et al. |
| 2004/0130788 A1* | 7/2004 | Minami ................... G02B 5/00 359/601 |

(Continued)

FOREIGN PATENT DOCUMENTS

| EP | 2876532 | 5/2015 |
| JP | 2013-041585 | 2/2013 |

(Continued)

OTHER PUBLICATIONS

European Search Reported dated Jan. 7, 2016, in European Application No. 15176038.

*Primary Examiner* — Ariel A Balaoing
(74) *Attorney, Agent, or Firm* — H.C. Park & Associates, PLC

(57) ABSTRACT

A flexible display device includes a display panel including a first surface including a display area configured to display an image, and a second surface disposed on the opposite side of the display panel from the first surface, and a touch panel disposed on the first surface, the touch panel including a base film and a transparent conductive layer disposed on a surface of the base film facing the display panel, in which at least a portion of each of the display panel and the touch panel is bendable such that centers of curvature of the display panel and the touch panel are positioned outside the second surface.

18 Claims, 14 Drawing Sheets

(56) References Cited

U.S. PATENT DOCUMENTS

| | | | | |
|---|---|---|---|---|
| 2006/0274036 | A1* | 12/2006 | Hioki | G06F 3/0412 |
| | | | | 345/156 |
| 2008/0303782 | A1* | 12/2008 | Grant | G06F 1/1615 |
| | | | | 345/156 |
| 2010/0164888 | A1* | 7/2010 | Okumura | G06F 1/1626 |
| | | | | 345/173 |
| 2012/0133621 | A1* | 5/2012 | Kim | H04M 1/0206 |
| | | | | 345/204 |
| 2013/0076649 | A1* | 3/2013 | Myers | H04M 1/0268 |
| | | | | 345/173 |
| 2013/0127776 | A1* | 5/2013 | Guard | G06F 3/0412 |
| | | | | 345/174 |
| 2013/0181911 | A1* | 7/2013 | Yilmaz | G06F 3/044 |
| | | | | 345/173 |
| 2013/0241862 | A1* | 9/2013 | Kim | C09J 7/0246 |
| | | | | 345/173 |
| 2013/0300677 | A1 | 11/2013 | Kim et al. | |
| 2014/0043734 | A1 | 2/2014 | Kim et al. | |
| 2014/0132553 | A1 | 5/2014 | Park et al. | |
| 2015/0145824 | A1 | 5/2015 | Park et al. | |
| 2015/0185942 | A1* | 7/2015 | Kim | G06F 3/0412 |
| | | | | 345/173 |

FOREIGN PATENT DOCUMENTS

| | | |
|---|---|---|
| KR | 10-1156880 | 9/2011 |
| KR | 10-1292361 | 10/2011 |
| KR | 10-2013-0017901 | 2/2013 |
| KR | 10-2013-0034272 | 4/2013 |
| KR | 10-2013-0100355 | 9/2013 |
| KR | 10-2014-0015937 | 2/2014 |

\* cited by examiner

FLEXIBLE DISPLAY DEVICE WITH TOUCH PANEL

CROSS-REFERENCE TO RELATED APPLICATION

This application claims priority from and the benefit of Korean Patent Application No. 10-2014-0088639, filed on Jul. 14, 2014, which is hereby incorporated by reference for all purposes as if fully set forth herein.

BACKGROUND

Field

Exemplary embodiments of the inventive concept relate to a flexible display device, and more particularly, to a flexible display device including a capacitive type external touch panel.

Discussion of the Background

A touch panel disposed on a display device provides a touch sensing function that facilitates interaction with a user. The touch sensing function extracts contact information, such as sensing a touch or location of a touched surface when a user approaches or contacts the surface of the display device with the user's finger or a touch pen. The display device may receive image signals based on the contact information to display corresponding images.

The capacitive touch panel may include a sensing capacitor having sensing electrodes. The capacitive touch panel may determine whether a touch was made and a location of a touched surface by sensing a change in electrostatic capacitance of the sensing capacitor that is generated when a conductor, such as a finger of the user, approaches the touch panel. The sensing electrodes may be formed of a transparent conductive layer such as indium tin oxide (ITO), and patterned on a transparent substrate.

The development of the flexible display device requires providing flexibility to the touch panel. Accordingly, a touch panel including a substrate formed of a transparent plastic film has been developed. However, transparent conductive layer used as the sensing electrodes may have high light transmittance and high electrical conductivity but low flexibility. In other words, while transparent conductive layer may be thin, it may maintain a brittle characteristic.

Silver nanowire (AgNW), carbon nanotubes (CNT), or graphene may be considered as an electrode material for replacing the transparent conductive layer of the touch panel, but these materials may have a low optical characteristic (low light transmittance). Meanwhile, a technique of pre-forming a curved substrate of the touch panel and then adhering the sensing electrode to the curved surface of the substrate may also be considered. However, it may be difficult to pattern the sensing electrode to the curved surface of the substrate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the inventive concept provide a flexible display device capable of suppressing cracks in a transparent conductive layer caused by bending when the transparent conductive layer, such as indium tin oxide (ITO), is employed as a sensing electrode of a touch panel.

Exemplary embodiment of the inventive concept also provide a flexible display device capable of having a specific curved shape or of repetitive folding and including a touch panel manufactured by patterning sensing electrodes on a flat substrate.

Additional aspects of the inventive concept will be set forth in the detailed description which follows, and, in part, will be apparent from the disclosure, or may be learned by practice of the inventive concept.

An exemplary embodiment of the inventive concept provides a flexible display device includes a display panel including a first surface including a display area configured to display an image, and a second surface disposed on the opposite side of the display panel from the first surface; and a touch panel disposed on the first surface, the touch panel including a base film and a transparent conductive layer disposed on a surface of the base film facing the display panel, in which at least a portion of each of the display panel and the touch panel is bendable such that centers of curvature of the display panel and the touch panel are positioned outside the second surface.

The transparent conductive layer may further include a sensing electrode disposed on the base film and a functional coating layer covering the transparent conductive layer and the sensing electrode unit, in which the functional coating layer may be configured to create an anchor effect with the sensing electrode unit.

The functional coating layer may contain an acryl-based resin or a polyurethane-based resin, and the thickness of the functional coating layer is in a range from 0.1 μm to 30 μm.

The functional coating layer may have a refractive index in a range from 1.3 to 2.0.

The functional coating layer may be covered with a protective film. The protective film may contain at least one of polyethylene terephthalate (PET), a cyclo-olefin polymer (COP), triacetyl cellulose (TAC), and a polycarbonate (PC).

Another exemplary embodiment of the inventive concept provides a flexible display device includes a display panel including a first surface including a display area configured to display an image, and a second surface disposed on the opposite side to the display panel from the first surface, and a touch panel disposed on the first surface, the touch panel including a base film and a sensing electrode unit including a transparent conductive layer disposed on the base film, in which the sensing electrode unit includes first sensing electrodes extending in a first direction and second sensing electrodes disposed in a second direction perpendicular to the first direction, at least one of the first sensing electrodes and the second sensing electrodes is disposed on a surface of the base film facing the display panel, and at least a portion of each of the display panel and the touch panel is bendable such that centers of curvature of the display panel and the touch panel are positioned outside the second surface.

The first sensing electrodes and the second sensing electrodes may be disposed on a surface of the base film facing the display panel, and the first sensing electrodes may be insulated from the second sensing electrodes by an insulating layer.

The first sensing electrodes and the second sensing electrodes may be covered with a functional coating layer, and the functional coating layer may be covered with a protective film.

The touch panel may include a first base film and a second base film overlapping each other, the first sensing electrodes may be disposed on a surface of the first base film facing the display panel, and the second sensing electrodes may be disposed on a surface of the second base film facing the display panel.

The first sensing electrodes may be covered with a first functional coating layer, and the second sensing electrodes may be covered with a second functional coating layer.

The second functional coating layer may be disposed closer to the display panel than the first functional coating layer, and the second functional coating layer may be covered with a protective film.

The touch panel may include a first base film and a second base film overlapping each other, and the first sensing electrodes may be disposed on a surface of the first base film facing the display panel. The second base film may be disposed closer to the display panel than the first base film, and the second sensing electrodes may be disposed on a surface of the second base film facing the first base film.

The first sensing electrodes may be covered with a first functional coating layer, and the second sensing electrodes may be covered with a second functional coating layer.

Yet another exemplary embodiment of the inventive concept provides a flexible display device includes a display panel including a first surface including a display area configured to display an image, and a second surface disposed on the opposite side of the display panel from the first surface, a touch panel disposed on the first surface, the touch panel including a base film and a sensing electrode unit including a transparent conductive layer, and a cover window disposed on the touch panel, in which the sensing electrode unit includes first sensing electrodes disposed on a surface of the cover window facing the base film, and second sensing electrodes disposed on a surface of the base film facing the display panel, and at least a portion of each of the display panel, the touch panel, and the cover window is bendable, such that centers of curvature thereof are positioned outside the second surface.

The first sensing electrodes may be covered with a first functional coating layer, and the second sensing electrodes may be covered with a second functional coating layer. The second functional coating layer may be covered with a protective film.

According to exemplary embodiments of the inventive concept, a stress applied to a transparent conductive layer of a touch panel may be reduced, thereby suppressing crack generation of the transparent conductive layer and improving folding endurance. Further, the touch panel according to the exemplary embodiments may require no changes in the existing manufacturing process and electrode materials of the touch panel, and thus may be easily manufactured by using the same process.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
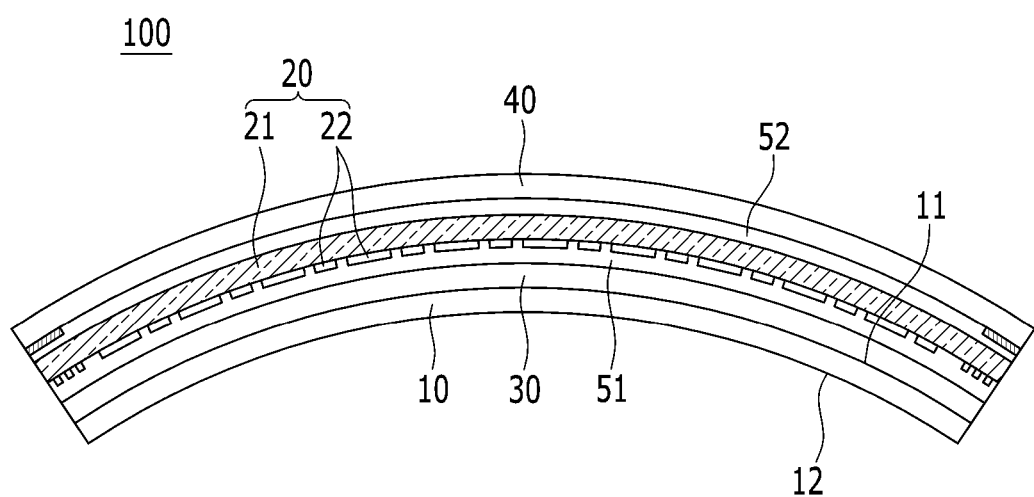
FIG. 1 is a schematic cross-sectional view illustrating a flexible display device according to an exemplary embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic cross-sectional view illustrating a flexible display device 100 according to an exemplary embodiment of the inventive concept.

Referring to FIG. 1, the flexible display device 100 according to the first exemplary embodiment includes a display panel 10 and a touch panel 20 disposed on the display panel 10. The display panel 10 includes a first surface 11 on which a display area (DA in FIG. 5) is formed, and a second surface 12 disposed on the opposite side of the display panel 10 from the first surface. The touch panel 20 is disposed on the first surface 11 to cover the display area.

The flexible display device 100 may further include a polarization member 30 disposed between the display panel 10 and the touch panel 20, and a cover window 40 that is disposed on the touch panel 20. The polarization member 30 may be formed of a combination of a linear polarizer and a quarter wave plate, and may suppress reflection of external light. The touch panel 20 may be adhered on the polarization member 30 by a first transparent adhesive layer 51, and the cover window 40 may be attached on the touch panel 20 by a second transparent adhesive layer 52.

Each of the display panel 10, the polarization member 30, the touch panel 20, and the cover window 40 may be formed of a flexible plastic film as a basic member, thereby having a flexible characteristic of being bendable by an external force. In FIG. 1, the flexible display device 100 is illustrated as having a stacked structure of the display panel 10, the polarization member 30, the touch panel 20, and the cover window 40. However, the positions of the polarization member 30 and the touch panel 20 may be switched.

The flexible display device 100 is formed to have a single curvature on a whole part thereof, thereby being bendable. In this case, a center of the curvature is positioned outside the second surface 12 of the display panel 10. That is, the center of the curvature is the end point of a radius line extending from the curved display panel 10. As a result, a screen of the flexible display device 100 is convexly bendable with respect to a user. The flexible display device 100 may statically maintain a bended state, or may repeatedly accomplish the bended state and a flat state. In the case of repeatedly accomplishing the bended state and the flat state, the flexible display device 100 may be described to have a foldable or bendable function.

Figure 2:
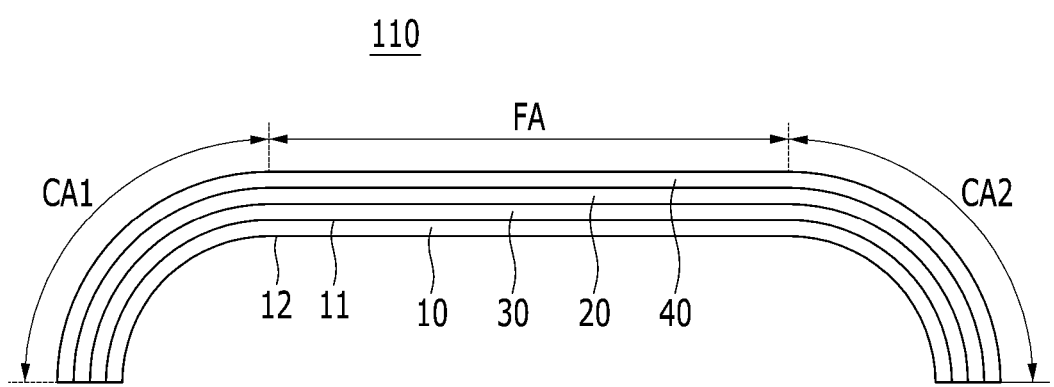
FIG. 2, FIG. 3, and FIG. 4 are respectively schematic cross-sectional views of variations of the flexible display device shown in FIG. 1.
Figure 3:
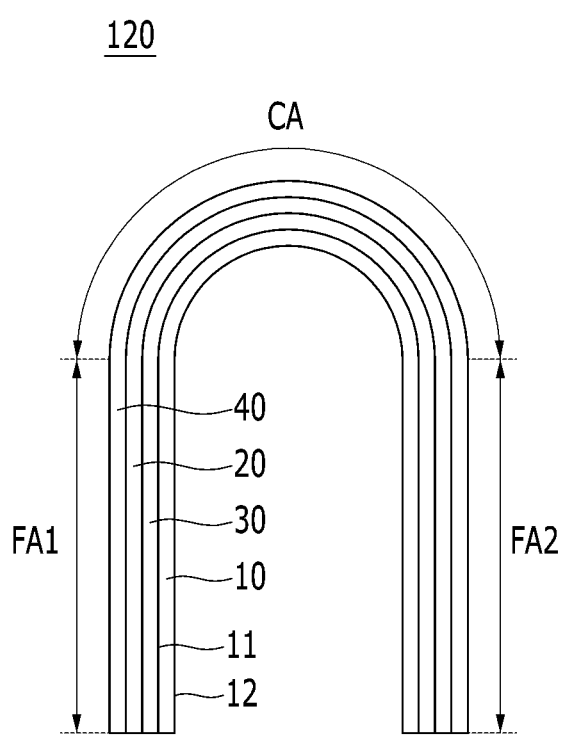
Figure 4:
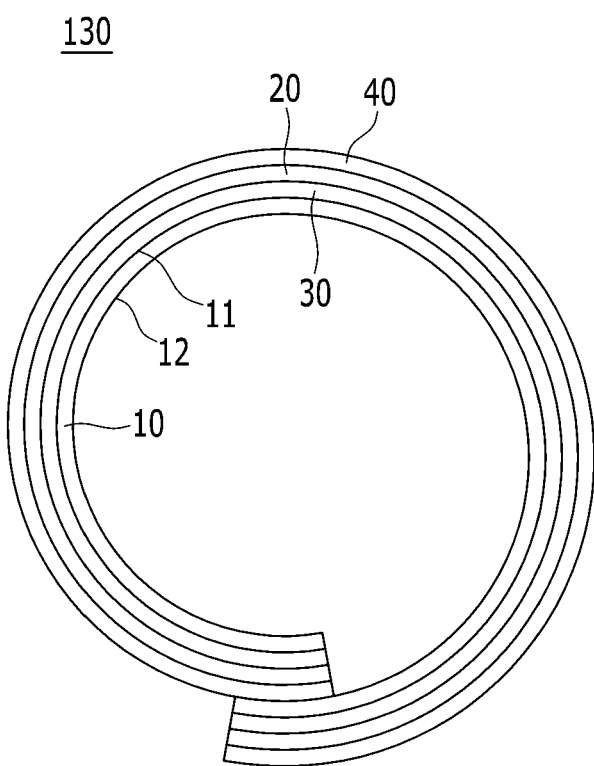

The flexible display device 100 may have various curved shapes including the curved shape shown in FIG. 1. FIG. 2 to FIG. 4 are schematic cross-sectional views of various exemplary variations of the flexible display device 100 shown in FIG. 1. For the convenience of description, in FIG. 2 to FIG. 4, each of the flexible display devices 110, 120, and 130 is briefly illustrated with the display panel 10, the polarization member 30, the touch panel 20, and the cover window 40.

Referring to FIG. 2, a flexible display device 110 according to an exemplary embodiment includes a flat portion FA, and a first curved portion CA1 and a second curved portion CA2 that are respectively disposed at opposite sides of the flat portion FA. Centers of the curvature of the first curved portion CA1 and the second curved portion CA2 are positioned outside the second surface 12 of the display panel 10. A radius of curvature of the first curved portion CA1 may be set to be the same as or different from that of the second curved portion CA2.

Referring to FIG. 3, a flexible display device 120 according to another exemplary embodiment includes a curved portion CA, and a first flat portion FA1 and a second flat portion FA2 that are respectively disposed at opposite sides of the curved portion CA. A center of the curvature of the curved portion CA is positioned outside the second surface 12 of the display panel 10. A width of the first flat portion FA1 may be set to be the same as or different from that of the second flat portion FA2.

Referring to FIG. 4, a flexible display device 130 according to another exemplary embodiment is bended in such a ring shape so as to fold opposite ends thereof around each other or to overlap their parts with each other. In this case, centers of the curvature are positioned outside the second surface 12. In all of the exemplary embodiments shown in FIG. 1 to FIG. 4, the flexible display devices 100, 110, 120, and 130 may statically maintain a bended state, or may repeatedly accomplish the bended state and a flat state.

Various curved shapes that can be embodied by the flexible display device are illustrated in FIG. 1 to FIG. 4, but the curved shape of the flexible display device is not limited thereto. In all of the exemplary embodiments shown in FIG. 1 to FIG. 4, at least a part of each of the flexible display devices 100, 110, 120, and 130 is bendable, and the centers of their curvature are positioned outside the second surface 12.

Figure 5:
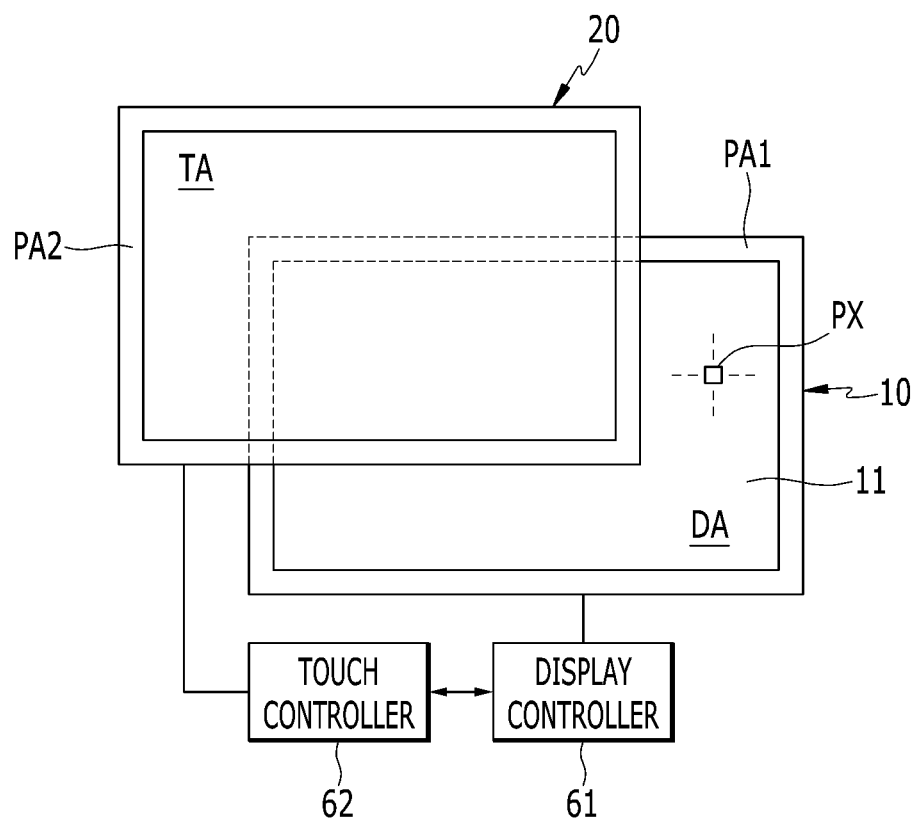
FIG. 5 is a block diagram illustrating a display panel and a touch panel of the flexible display device shown in FIG. 1.

FIG. 5 is a block diagram illustrating a display panel 10 and a touch panel 20 of the flexible display device 100 shown in FIG. 1.

Referring to FIG. 5, a display area DA on which an image may be displayed is disposed on the first surface 11 of the display panel 10. The display panel 10 may be a flat display panel such as an organic light emitting diode (OLED) device, a liquid crystal display (LCD), or an electrophoretic display device. By employing a plastic film such as polyimide as a substrate, the display panel 10 may have a flexible characteristic of being bendable by an external force.

In the display area DA, a plurality of pixels PX, a plurality of gate lines (not shown) connected to the pixels PX to transmit driving signals, and a plurality of data lines (not shown) may be disposed. In the case of the organic light emitting diode panel, each pixel PX may include a gate line, a switching element (not shown) connected to the data line, and a pixel electrode (not shown) connected to the switching element.

The switching element may be turned on or off according to a gate signal from the gate line to selectively transmit a data signal from the data line to a pixel electrode. The pixel PX may further include a common electrode (not shown) disposed to be opposite to the pixel electrode and an emission layer disposed between the pixel electrode and the common electrode to form a light-emitting device. The gate line and the data line may be extended to a peripheral area PA1 to form a pad portion (not shown).

A display controller 61 may receive an input signal containing luminance information of each pixel PX and an input control signal for controlling display thereof from an external device. The display controller 61 may convert the input image signal into an output image signal by processing it based on the input control signal, and may generate control signals such as a gate control signal and a data control signal. The display controller 61 may output a gate control signal to a gate driver (not shown), and a data control signal and an output image signal to a data driver (not shown).

The touch panel 20 includes a touch region TA that includes a sensing electrode unit 22 and a peripheral area PA2 positioned outside the touch region TA. At the peripheral area PA2, connection wires (not shown) for connecting each of first sensing electrodes 23 and second sensing electrodes 24 to a touch controller 62 may be formed.

The touch region TA may sense a touch when an object actually approaches or contacts the flexible display device 100. Herein, the contact may include an external object, such as a user's finger, approaching the flexible display device 100, hovering while the external object approached the flexible display device 100, or directly contacting the flexible display device 100. The touch region TA may be formed to have an area that is equal to or smaller than that of the display area DA.

The touch controller 62 may be connected to the sensing electrode unit 22 to control an operation of the touch panel 20. The touch controller 62 may transmit a sensing input signal to the sensing electrode unit 22 or may receive a sensing output signal to perform processing. The touch controller 62 may process the sensing output signal to generate contact information which may include whether a touch was made and a location of the touched surface of the flexible display device 100. The touch panel 20 may be connected to the touch controller 62 and the display controller 61 so that the operation thereof may be controlled.

Figure 6:
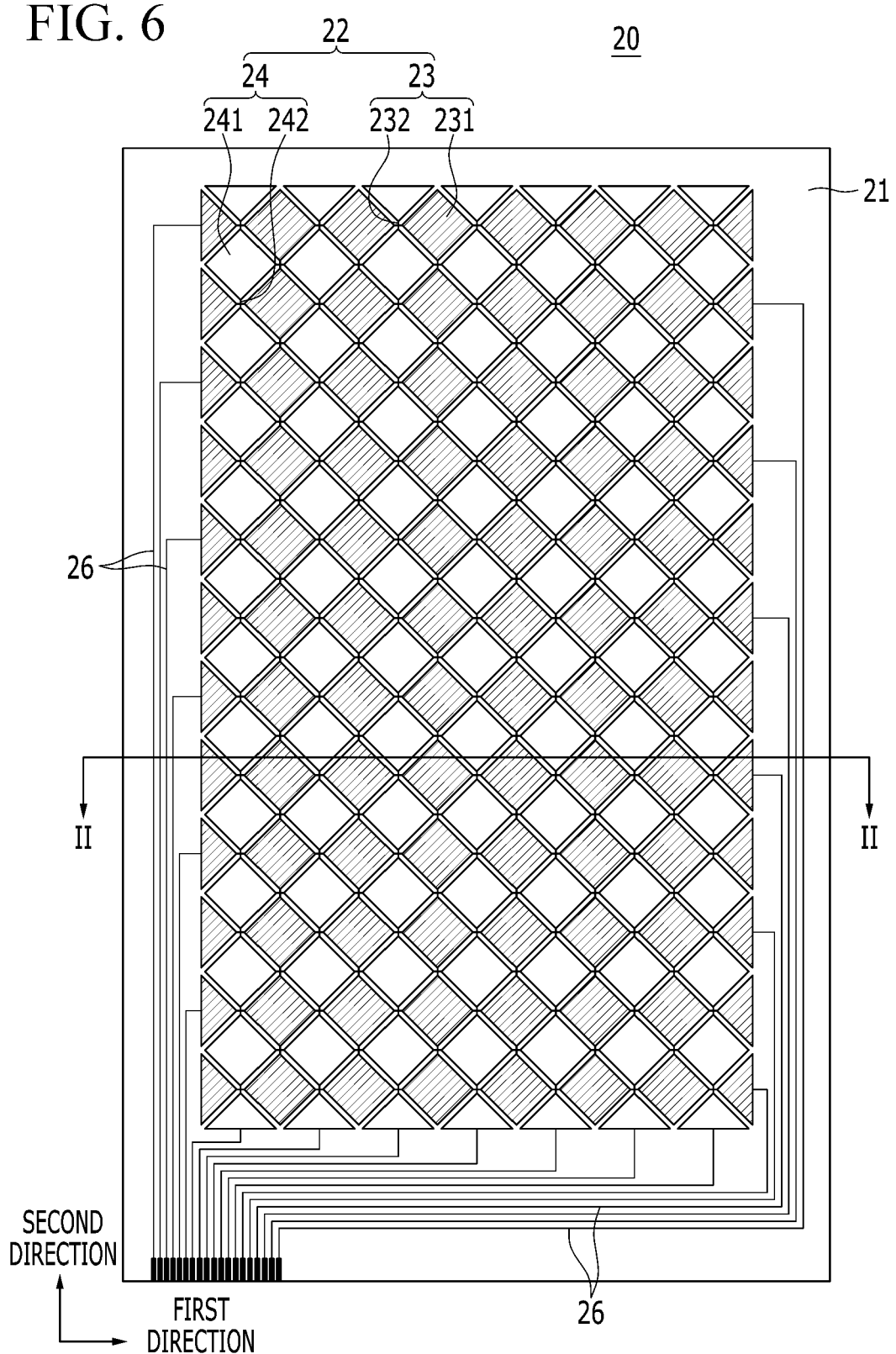
FIG. 6 is a bottom view illustrating a touch panel of the flexible display device shown in FIG. 1.
Figure 7:
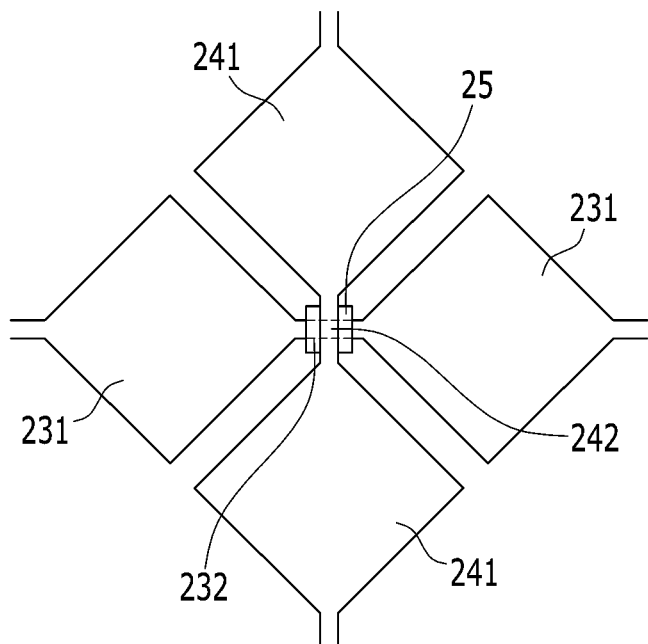
FIG. 7 is a partially enlarged view of FIG. 6.
Figure 8:
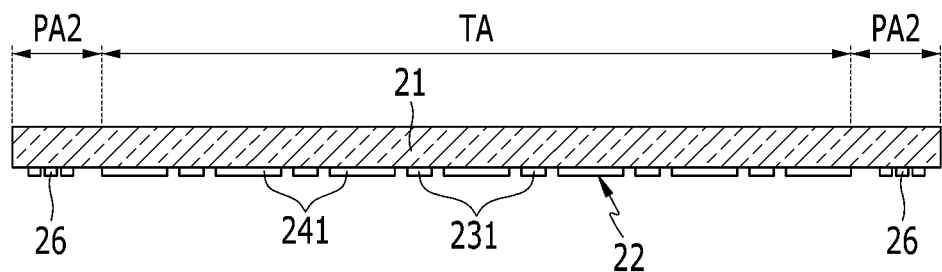
FIG. 8 is a cross-sectional view taken along the line II-II of FIG. 6.

FIG. 6 is a bottom view illustrating a touch panel 20 of the flexible display device 100 shown in FIG. 1. FIG. 7 is a partially enlarged view of FIG. 6, and FIG. 8 is a cross-sectional view taken along the line II-II of FIG. 6. For convenience of description, in FIG. 6 to FIG. 8, the touch panel is illustrated as a flat type.

Referring to FIG. 6 to FIG. 8, the touch panel 20 according to the present exemplary embodiment includes a transparent base film 21, and a sensing electrode unit 22 disposed on a surface of the base film 21 facing the display panel 10. The base film 21 may be formed of a polymer film such as polyimide to provide flexibility to the touch panel 20.

The sensing electrode unit 22 may include a plurality of first sensing electrodes 23 arranged in a first direction, and a plurality of second sensing electrodes 24 arranged in a second direction while maintaining an insulating state from the first sensing electrodes 23. Herein, the first direction and the second direction may be perpendicular to each other, thereby the first sensing electrodes 23 and the second sensing electrodes 24 are arranged in a matrix form.

The first sensing electrodes 23 may include a plurality of first sensing cells 231, and a plurality of first connections 232 for connecting the first sensing cells 231. The second sensing electrodes 24 may include a plurality of second sensing cells 241, and a plurality of second connections 242 for connecting the second sensing cells 241. Each of the sensing cells 231 and 241 has a quadrangular shape. The first sensing cells 231 and the second sensing cells 241 are separated from each other to prevent them from being folded by or overlap with each other. The first connections 232 and the second connections 242 overlap with each other, but an insulating layer 25 may be disposed therebetween to prevent electrical connection.

According to the present exemplary embodiment, the sensing electrode unit 22 may be formed of a transparent conductive layer. The transparent conductive layer may include at least one of indium tin oxide (ITO), indium zinc oxide (IZO), indium oxide ($In_2O_3$), and zinc oxide (ZnO).

At the peripheral area PA2 positioned outside the touch region TA, connection wires 26 for connecting each of the first sensing electrodes 23 and the second sensing electrodes 24 to the touch controller 62 are formed. The connection wires 26 may be formed of a low-resistance metal film such as molybdenum (Mo), silver (Ag), titanium (Ti), cooper (Cu), and aluminum (Al), as well as a transparent conductive layer.

The touch controller 62 may sense a touch position by inputting a sensing input signal into at least one of the first sensing electrodes 23 and the second sensing electrodes 24 and receiving a sensing output signal. A method for sensing the touch position may include a self-capacitance method and a mutual capacitance method. For example, in the self-capacitance method, the first sensing electrodes 23 and the second sensing electrodes 24 receive the sensing input signal. When a conductive object such as a finger or a touch pen contacts a specific region of the touch region TA, the capacitance of the sensing electrode unit 22 in that region may change. Then, the touch controller 62 searches for a position of the first sensing electrodes 23 or the second sensing electrodes 24 in which the capacitance change is sensed, and detects it as the touch position.

The touch panel 20 may prevent crack generation caused by bending by changing the position of the sensing electrode unit 22 while employing the transparent conductive layer, such as ITO, as the sensing electrode unit 22. Specifically, the sensing electrode unit 22 is formed on a surface of the base film 21 facing the display panel 10, rather than being formed on a surface of the base film 21 facing the cover window 40. In this case, at least a part of the flexible display device 100, and a center of the curvature thereof, is positioned outside the second surface 12 of the display panel 10.

Figure 9:
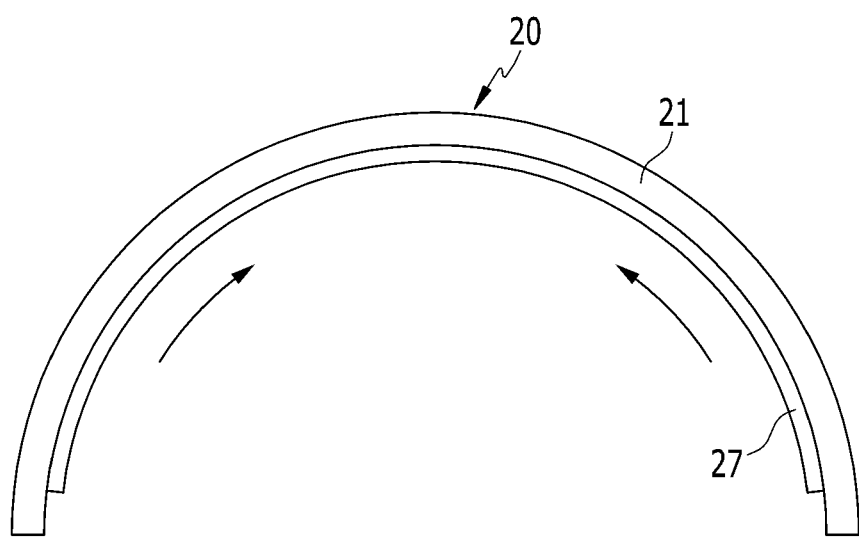
FIG. 9 is a schematic diagram illustrating a touch panel of the flexible display device of FIG. 1.
Figure 10:
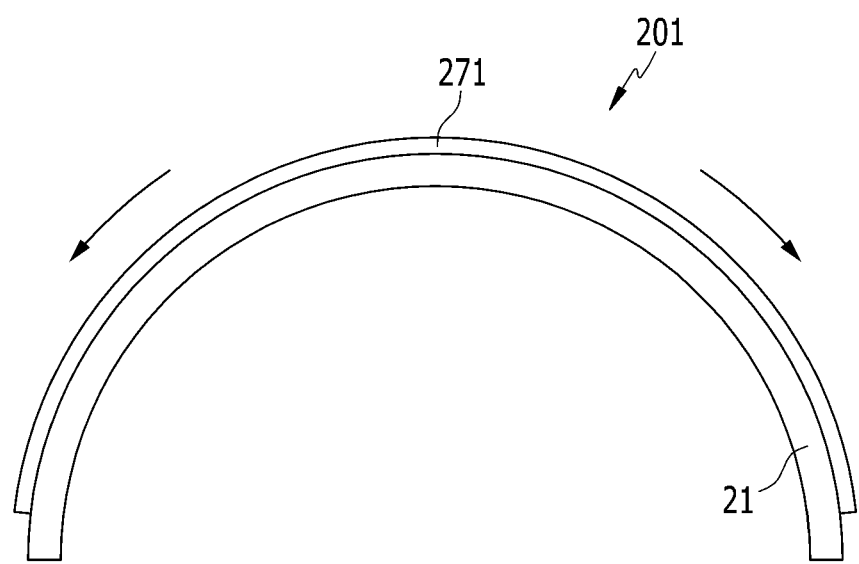
FIG. 10 is a schematic diagram illustrating a touch panel according to a comparative embodiment.

FIG. 9 is a schematic diagram illustrating a touch panel 20 of the flexible display device 100 of FIG. 1. FIG. 10 is a schematic diagram illustrating a touch panel 201 according to a comparative embodiment.

As shown in FIG. 9, in the touch panel 20 according to the present exemplary embodiment, a transparent conductive layer 27 is formed on a surface of the base film 21 facing a center of the curvature thereof. In contrast, as shown in FIG. 10, in a touch panel 201 according to a comparative embodiment, a transparent conductive layer 271 may be formed on a surface of the base film 21 that is opposite to a center of the curvature thereof. As a result, a compressive force is applied to the transparent conductive layer 27 according to the present exemplary embodiment, while a tensile force is applied to the transparent conductive layer 271 according to the comparative embodiment.

Figure 11:
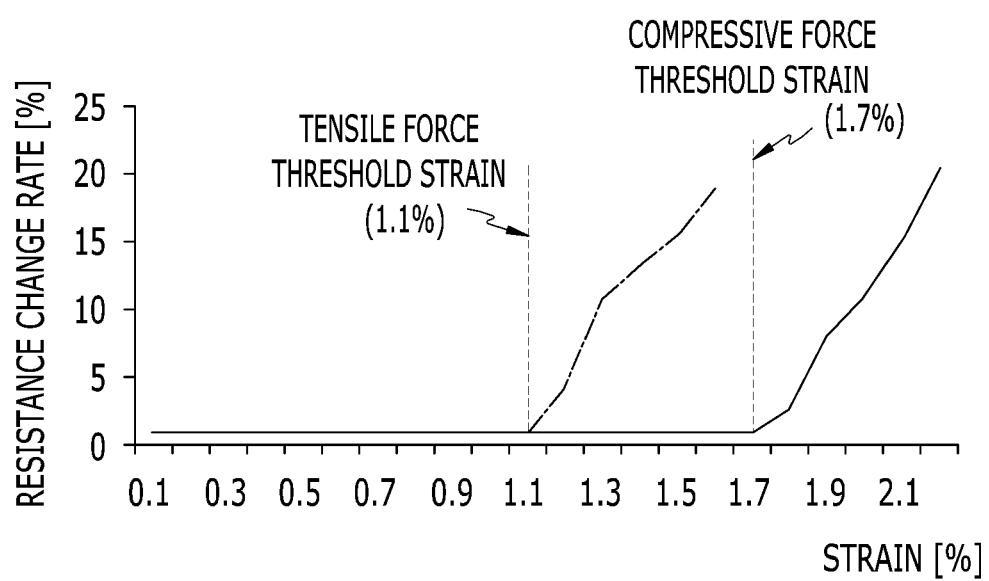
FIG. 11 is a graph illustrating threshold strains according to a tensile force and a compressive force of a transparent conductive layer.

FIG. 11 is a graph illustrating threshold strains according to a tensile force and a compressive force of a transparent conductive layer 27 and 271.

As shown in FIG. 11, a threshold strain (1.1%) of the transparent conductive layer 271 to which the tensile force is applied is smaller than a threshold strain (1.7%) of the transparent conductive layer 27 to which the compressive force is applied in two transparent conductive layers having the same size and thickness. Accordingly, the transparent conductive layer 27 to which the compressive force is applied is stronger than the transparent conductive layer 271 to which the tensile force is applied, with respect to an external force.

Figure 12:
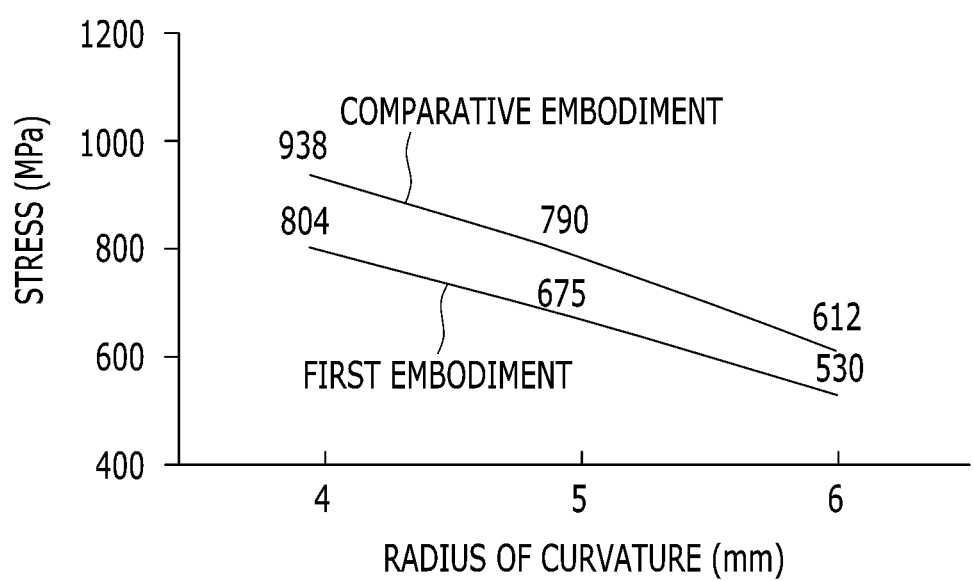
FIG. 12 is a graph illustrating stresses according to a radius of curvature of the transparent conductive layer.

FIG. 12 is a graph illustrating stresses according to a radius of curvature of the transparent conductive layer 271. Herein, both of the touch panels 20 and 201 according to the present exemplary embodiment and the comparative embodiment include a base film 21 having a thickness of 80 µm.

As shown in FIG. 12, a smaller stress is applied to the transparent conductive layer 27 included in the touch panel 20 according to the present exemplary embodiment than in the touch panel 201 according to the comparative embodiment, under all conditions of the radius of curvature in a range of 4 mm to 6 mm. Specifically, under the condition of the radius of curvature of 5 mm, the stress of the transparent conductive layer 27 included in the touch panel 20 according to the present exemplary embodiment is smaller than that of the transparent conductive layer 271 included in the touch panel 201 according to the comparative embodiment.

As such, the touch panel 20 according to the present exemplary embodiment can more efficiently suppress crack generation of the transparent conductive layer 27 thereof by reducing the stress of the transparent conductive layer 27 than the touch panel 201 according to the comparative embodiment, thereby improving folding endurance. Accordingly, the flexible display device 100 may improve durability of the product by suppressing failure occurrence of the touch panel 20 caused by folding.

The touch panel 20 according to the present exemplary embodiment may require no change in the existing manufacturing process and electrode materials of the touch panel 20, and thus may be easily manufactured by using the existing manufacturing process. Further, the flat base film 21 of the touch panel 20 according to the present exemplary embodiment may be patterned with the sensing electrode unit 22 and the connection wires 26 as in the existing process, and may be easily attached on the display panel 10 by using the first transparent adhesive layer 51.

Figure 13:
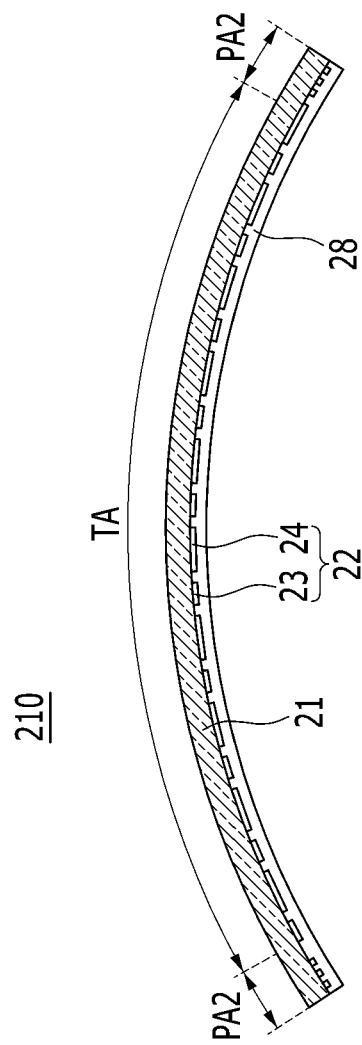
FIG. 13 is a cross-sectional view of a touch panel of a flexible display device according to an exemplary embodiment of the inventive concept.

FIG. 13 is a cross-sectional view of a touch panel 210 of a flexible display device according to an exemplary embodiment of the inventive concept. All constituent elements other than the touch panel 210 in the flexible display device according to the present exemplary embodiment are substantially similar to those in the flexible display device according to the exemplary embodiment described with respect to FIG. 1, and repeated description thereof is omitted.

Referring to FIG. 13, the touch panel 210 according to the present exemplary embodiment may further include a functional coating layer 28 that covers the sensing electrode unit 22. The functional coating layer 28 may be formed of an acryl-based resin or a polyurethane-based resin. An anchor effect creates a high surface bonding force between the functional coating layer 28 and a surface of the sensing electrode unit 22, thereby suppressing crack generation. The anchor effect is mechanical bonding that occurs when the functional coating layer 28 penetrates to an empty hole or a concave region of the surface of the sensing electrode unit 22 and consolidates therein.

The functional coating layer 28 may be formed by employing a wet-coating method using a liquid resin, or by stacking a dry film resin on the sensing electrode unit 22 and hardening the stacked resin. The functional coating layer 28 may be formed to have a thin thickness in a range from about 0.1 to 30 µm, thereby minimizing an increase in the thickness of the touch panel 210 and a decrease in optical transparency. The functional coating layer 28 may be formed on the touch region TA only, or may be formed on the touch region TA and the peripheral area PA2.

In a typical touch panel, the base film 21 may include an optical index matching layer for preventing the sensing electrode unit 22 from being seen. For example, when the sensing electrode unit 22 is formed of ITO, the base film 21 may include the optical index matching layer including silicon dioxide ($SiO_2$) on a surface thereof facing the sensing electrode unit 22.

In the present exemplary embodiment, the touch panel 210 can use the functional coating layer 28 as the optical index matching layer by controlling a refractive index of the functional coating layer 28, and thus the conventional optical index matching layer may be omitted. The functional coating layer 28 may have a refractive index in a range from 1.3 to 2.0. When the functional coating layer 28 with a refractive index within the range from 1.3 to 2.0 is formed to have a thickness in a range from 0.1 μm to 30 μm, and the sensing electrode unit 22 is formed of ITO to have a thickness in a range from 10 nm to 200 nm, the sensing electrode unit 22 may be prevented from being seen.

Figure 14:
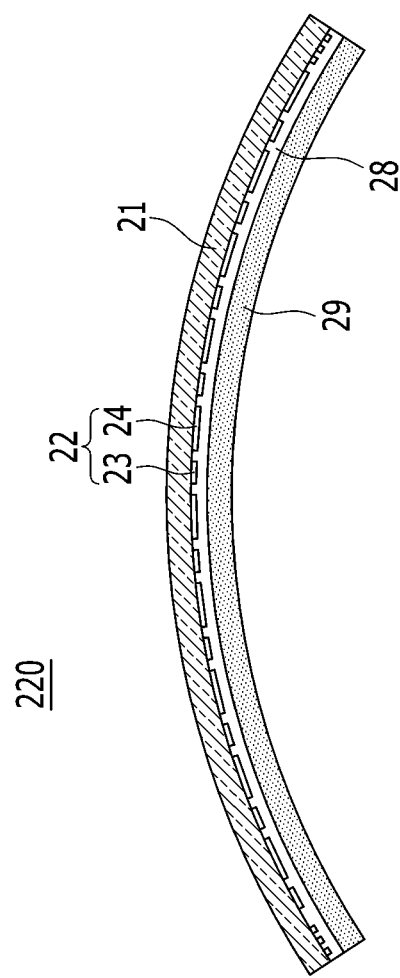
FIG. 14 is a cross-sectional view of a touch panel of a flexible display device according to an exemplary embodiment of the inventive concept.

FIG. 14 is a cross-sectional view of a touch panel 220 of a flexible display device according to an exemplary embodiment of the inventive concept. All constituent elements other than the touch panel 220 in the flexible display device according to the present exemplary embodiment are substantially similar to those in the flexible display device according to the exemplary embodiment described with respect to FIG. 1, and repeated description thereof is omitted.

Referring to FIG. 14, the touch panel 220 according to the present exemplary embodiment further includes a functional coating layer 28 that covers the sensing electrode unit 22, and a protective film 29 that covers the functional coating layer 28. The functional coating layer 28 according to the present exemplary embodiment is substantially similar to that of the exemplary embodiment described above with respect to FIG. 13.

The protective film 29 may block transmission of moisture and chemical materials, and may contain polyethylene terephthalate (PET), a cyclo-olefin polymer (COP), triacetyl cellulose (TAC), or a polycarbonate (PC). The protective film 29 protects the sensing electrode unit 22 and the functional coating layer 28, thereby increasing chemical resistance and anti-invasion of the touch panel 220. A transparent adhesive layer (not shown) may be interposed between the functional coating layer 28 and the protective film 29.

In the flexible display device according to the exemplary embodiments of the inventive concept, the first sensing electrodes 23 and the second sensing electrodes 24 constituting the sensing electrode unit 22 are formed on the same surface. However, the first sensing electrodes 23 and the second sensing electrodes 24 may be formed on different surfaces. This configuration will be described with reference to FIG. 15 to FIG. 17.

Figure 15:
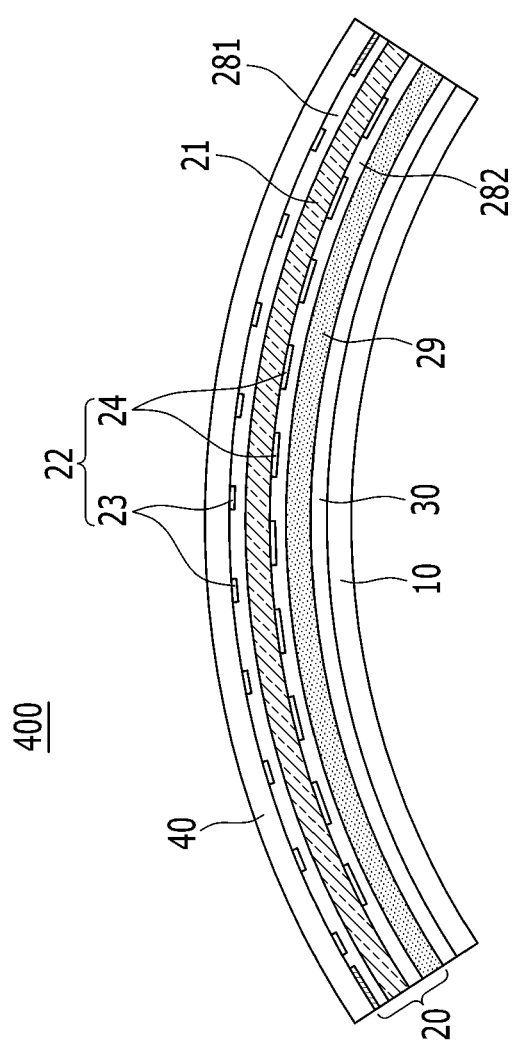
FIG. 15 is a cross-sectional view of a touch panel of a flexible display device according to an exemplary embodiment of the inventive concept.

FIG. 15 is a cross-sectional view of a touch panel 20 of a flexible display device 400 according to an exemplary embodiment of the inventive concept. The same elements will be designated by the same reference numerals as those in the other exemplary embodiments.

Referring to FIG. 15, in the flexible display device 400 according to the present exemplary embodiment, the first sensing electrodes 23 are formed on a surface of the cover window 40 facing the touch panel 20, and the second sensing electrodes 24 are formed on a surface of the base film 21 facing the display panel 10. The positions of the first sensing electrodes 23 and second sensing electrodes 24 may be switched. Specifically, the second sensing electrodes 24 may be formed on the cover window 40, and the first sensing electrodes 23 may be formed on the base film 21.

Since the first sensing electrodes 23 and the second sensing electrodes 24 are formed on the different surfaces, no insulating layer for insulating the first sensing electrodes 23 and the second sensing electrodes 24 may be provided. The first sensing electrodes 23 formed on the cover window 40 may be covered with a first functional coating layer 281, and the second sensing electrodes 24 formed on the base film 21 may be covered with a second functional coating layer 282. The materials, thicknesses, and refractive indexes of the functional coating layers 281 and 282 are substantially similar to those in the exemplary embodiment described above, and repeated description thereof is omitted.

The second functional coating layer 282 may be covered with the protective film 29, and the first functional coating layer 281 may also be covered with a protective film (not shown). The material and function of the protective film 29 are substantially similar to those in the exemplary embodiment described above, and repeated description thereof is omitted.

Figure 16:
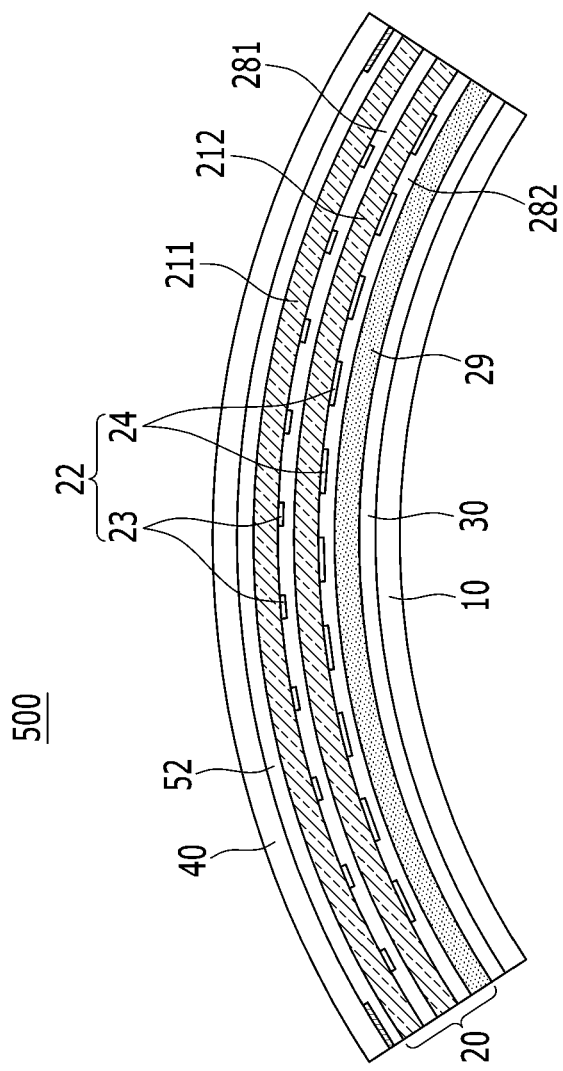
FIG. 16 is a cross-sectional view of a touch panel of a flexible display device according to an exemplary embodiment of the inventive concept.

FIG. 16 is a cross-sectional view of a touch panel 20 of a flexible display device 500 according to an exemplary embodiment of the inventive concept. The same elements will be designated by the same reference numerals as those in the exemplary embodiment described above with respect to FIG. 14.

Referring to FIG. 16, in the flexible display device 500 according to the present exemplary embodiment, the touch panel 20 includes a first base film 211 and a second base film 212 which overlap each other. The first sensing electrodes 23 may be formed on a surface of the first base film 211 facing the display panel 10, and the second sensing electrodes 24 may be formed on a surface of the second base film 212 facing the display panel 10.

The first sensing electrodes 23 may be covered with the first functional coating layer 281, and the second sensing electrodes 24 may be covered with the second functional coating layer 282. The materials, thicknesses, and refractive indices of the functional coating layers 281 and 282 are substantially similar to those described above with respect to FIG. 13, and repeated description thereof is omitted. The second functional coating layer 282 may be covered with the protective film 29. The material and function of the protective film 29 are substantially similar to those described above with respect to FIG. 14, and repeated description thereof is omitted.

Figure 17:
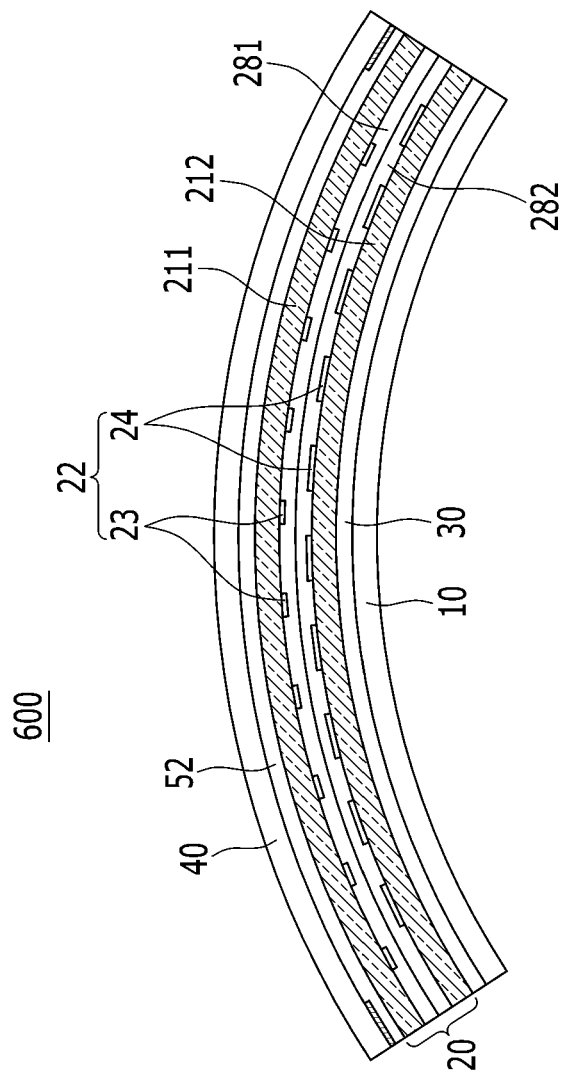
FIG. 17 is a cross-sectional view of a touch panel of a flexible display device according to an exemplary embodiment of the inventive concept.

FIG. 17 is a cross-sectional view of a touch panel 20 of a flexible display device 600 according to an exemplary embodiment of the inventive concept. The same elements will be designated by the same reference numerals as those described above.

Referring to FIG. 17, in the flexible display device 600 according to the present exemplary embodiment, the touch panel 20 includes a first base film 211 and a second base film 212 which overlap each other. The first sensing electrodes 23 may be formed on a surface of the first base film 211 facing the display panel 10, and the second sensing electrodes 24 may be formed on a surface of the second base film 212 facing the cover window 40.

The first sensing electrodes 23 may be covered with the first functional coating layer 281, and the second sensing electrodes 24 may be covered with the second functional coating layer 282. An adhesive layer (not shown) may be disposed between the first functional coating layer 281 and the second functional coating layer 282. The materials, thicknesses, and refractive indices of the functional coating layers 281 and 282 are substantially similar to those described with respect to FIG. 13, and repeated description thereof is omitted.

For convenience of description, in FIG. 15 to FIG. 17, the illustration of the first transparent adhesive layer for adhering the polarization member 30 and the touch panel 20 is omitted.

As described above, at least a part of the flexible display device is bendable. Accordingly, the center of the curvature thereof is positioned outside the second surface 12 of the display panel 10. In the touch panel 20, the transparent conductive layer may be formed on a surface of the base film 21 facing the display panel 10. The transparent conductive layer formed on the surface of the base film 21 facing the display panel 10 may include the first sensing electrodes 23 and the second sensing electrodes 24 or at least a part thereof.

When bended, the transparent conductive layer formed on the surface of the base film 21 facing the display panel 10 may be exposed to a compressive force rather than a tensile force, thereby reducing the stress and suppressing crack generation. In addition, the crack generation on the surface may further be suppressed by a high surface bonding force between the transparent conductive layer and the functional coating layer 28. In the flexible display device, the reliability and durability of products can be improved by suppressing the functional deterioration of the touch panel 20 caused by the cracks of the transparent conductive layer.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A flexible display device, comprising:
a display panel comprising:
a first surface comprising a display area configured to display an image; and
a second surface disposed on the opposite side of the display panel from the first surface; and
a touch panel disposed on the first surface, the touch panel comprising:
a base film; and
a transparent conductive layer disposed on a surface of the base film facing the display panel,
wherein at least a portion of each of the display panel and the touch panel is bendable, such that centers of curvature of the display panel and the touch panel are positioned outside the second surface, and
wherein the transparent conductive layer is configured to be applied with compressive force when the flexible display device is bent.

2. The flexible display device of claim 1, further comprising:
a sensing electrode unit disposed on the base film; and
a functional coating layer covering the transparent conductive layer and the sensing electrode unit,
wherein the functional coating layer is configured to create an anchor effect with the sensing electrode unit.

3. The flexible display device of claim 2, wherein:
the functional coating layer comprises an acryl-based resin or a polyurethane-based resin; and
the thickness of the functional coating layer is in a range from 0.1 µm to 30 µm.

4. The flexible display device of claim 3, wherein the functional coating layer has a refractive index in a range from 1.3 to 2.0.

5. The flexible display device of claim 2, further comprising a protective film covering the functional coating layer.

6. The flexible display device of claim 5, wherein the protective film comprises at least one of polyethylene terephthalate (PET), cyclo-olefin polymer (COP), triacetyl cellulose (TAC), and polycarbonate (PC).

7. A flexible display device, comprising:
a display panel comprising:
a first surface comprising a display area configured to display an image; and
a second surface disposed on the opposite side of the display panel from the first surface; and
a touch panel disposed on the first surface, the touch panel comprising:
a base film; and
a sensing electrode unit comprising a transparent conductive layer disposed on the base film,
wherein:
the sensing electrode unit comprises first sensing electrodes extending in a first direction and second sensing electrodes disposed in a second direction perpendicular to the first direction;
at least one of the first sensing electrodes and the second sensing electrodes is disposed on a surface of the base film facing the display panel;
at least a portion of each of the display panel and the touch panel is bendable, such that centers of curvature of the display panel and the touch panel are positioned outside the second surface; and
the sensing electrode unit is configured to be applied with compressive force when the flexible display device is bent.

8. The flexible display device of claim 7, wherein:
the first sensing electrodes and the second sensing electrodes are disposed on the surface of the base film facing the display panel; and
the first sensing electrodes are insulated from the second sensing electrodes by an insulating layer.

9. The flexible display device of claim 8, further comprising:
a functional coating layer covering the first sensing electrodes and the second sensing electrodes; and
a protective film covering the functional coating layer.

10. The flexible display device of claim 7, wherein:
the touch panel further comprises a first base film and a second base film overlapping each other;
the first sensing electrodes are disposed on a surface of the first base film facing the display panel; and
the second sensing electrodes are disposed on a surface of the second base film facing the display panel.

11. The flexible display device of claim 10, further comprising:
a first functional coating layer covering the first sensing electrodes; and
a second functional coating layer covering the second sensing electrodes.

12. The flexible display device of claim 11, wherein:
the second functional coating layer is disposed closer to the display panel than the first functional coating layer; and
the second functional coating layer is covered with a protective film.

13. The flexible display device of claim 7, wherein:
the touch panel further comprises a first base film and a second base film overlapping each other; and
the first sensing electrodes are disposed on a surface of the first base film facing the display panel.

14. The flexible display device of claim 13, wherein:
the second base film is disposed closer to the display panel than the first base film; and
the second sensing electrodes are disposed on a surface of the second base film facing the first base film.

15. The flexible display device of claim 14, further comprising:
- a first functional coating layer covering the first sensing electrodes; and
- a second functional coating layer covering the second sensing electrodes.

16. A flexible display device, comprising:
a display panel, comprising:
- a first surface comprising a display area configured to display an image; and
- a second surface disposed on the opposite side of the display panel from the first surface;

a touch panel disposed on the first surface, the touch panel comprising:
- a base film; and
- a sensing electrode unit comprising a transparent conductive layer disposed on a surface of the base film facing the display panel; and a cover window disposed on the touch panel,
wherein:
the sensing electrode unit comprises:
- first sensing electrodes disposed on a surface of the cover window facing the base film; and
- second sensing electrodes disposed on a surface of the base film facing the display panel;

at least a portion of each of the display panel, the touch panel, and the cover window is bendable, such that centers of curvature thereof are positioned outside the second surface; and the sensing electrode unit is configured to be applied with compressive force when the flexible display device is bent.

17. The flexible display device of claim 16, further comprising:
- a first functional coating layer covering the first sensing electrodes; and
- a second functional coating layer covering the second sensing electrodes.

18. The flexible display device of claim 17, further comprising a protective film covering the second functional coating layer.

* * * * *